W. T. JAMES.
DUMP CAR BODY.
APPLICATION FILED JUNE 4, 1917.
1,403,084.
Patented Jan. 10, 1922.
3 SHEETS—SHEET 1.
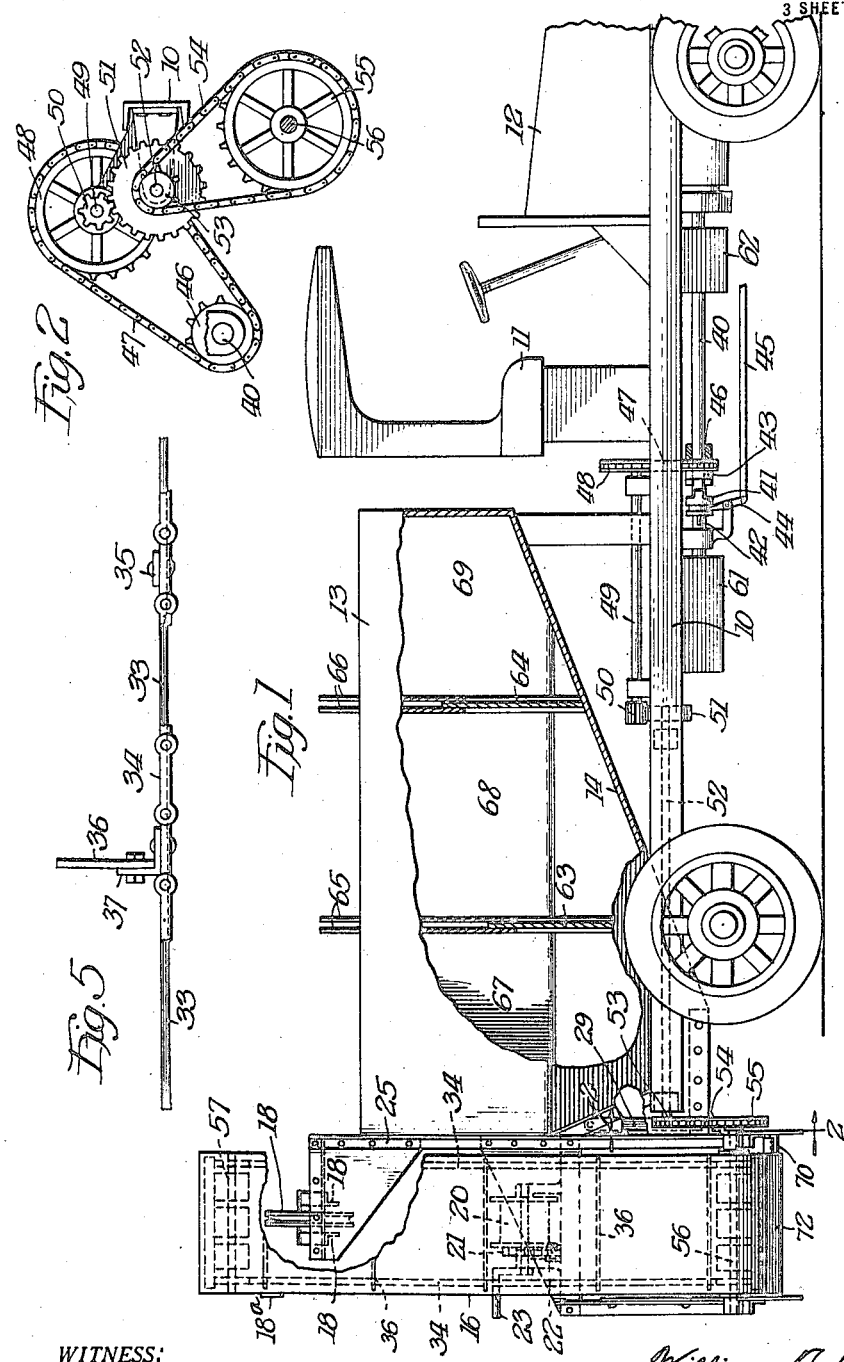
WITNESS:
Leonard W. Novander
INVENTOR.
William T. James
BY
ATTORNEY

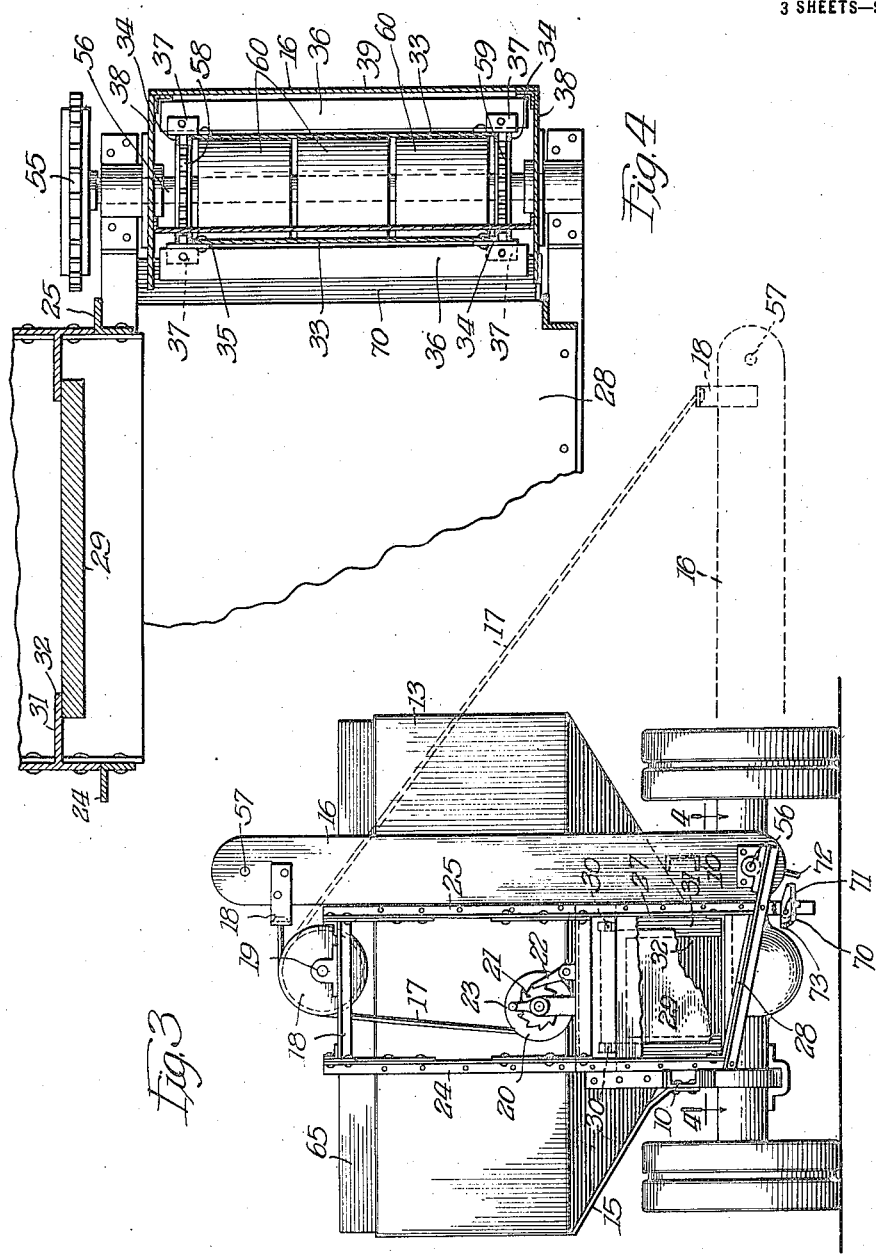

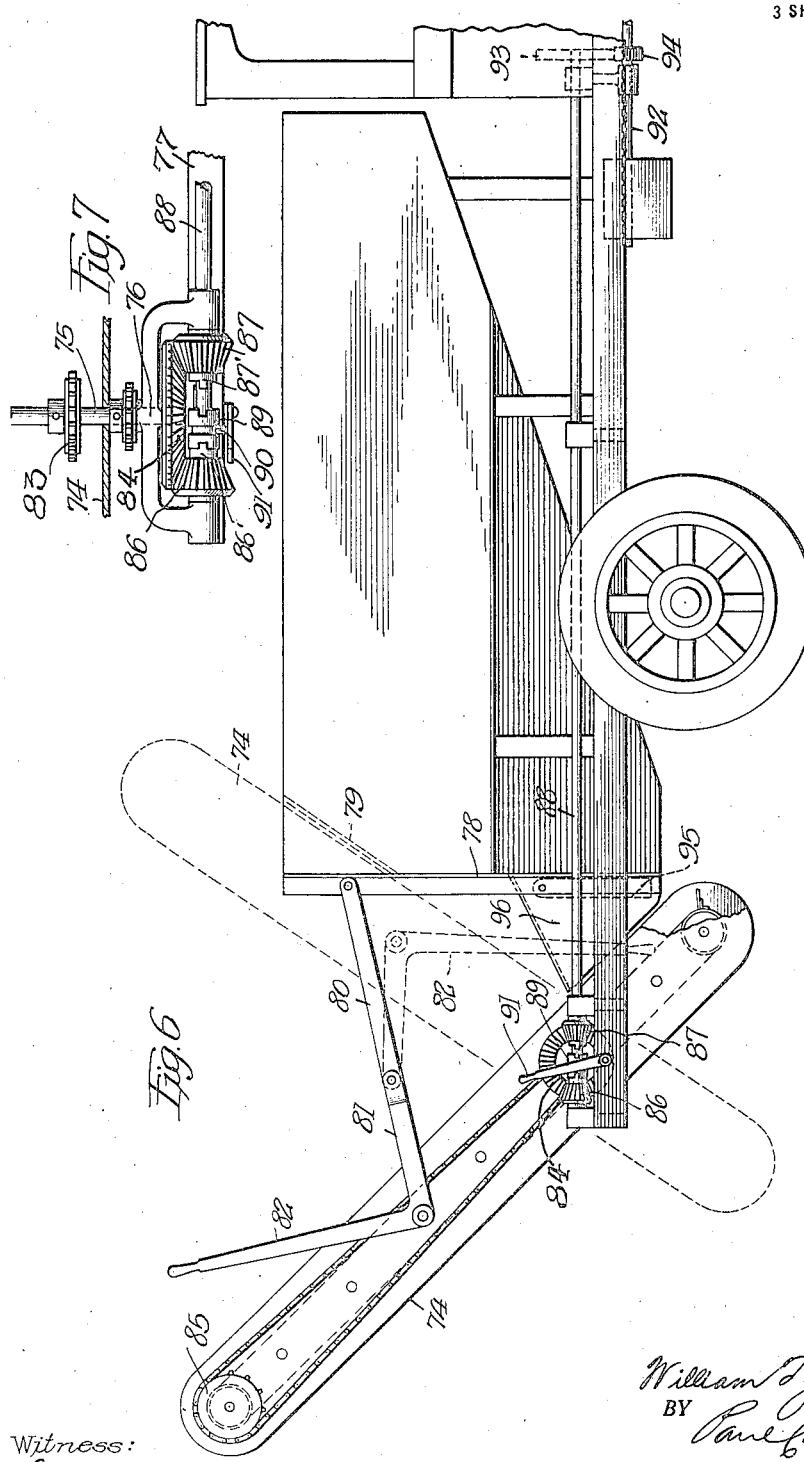

UNITED STATES PATENT OFFICE.

WILLIAM T. JAMES, OF CHICAGO, ILLINOIS.

DUMP-CAR BODY.

1,403,084.  Specification of Letters Patent.  Patented Jan. 10, 1922.

Application filed June 4, 1917. Serial No. 172,697.

*To all whom it may concern:*

Be it known that I, WILLIAM THOMAS JAMES, a citizen of the United States, and a resident of Chicago, in the county of Cook and State of Illinois, have invented certain new and useful Improvements in Dump-Car Bodies, of which the following is a specification.

My present invention relates to automobile trucks and has particular reference to means for loading and unloading such trucks.

The principal objects of my present invention are to provide improved means for loading and unloading automobile trucks, to provide improved conveyor means for transporting material discharged from such trucks, and generally to improve, simplify and cheapen the construction of automobile trucks.

In attaining these and other objects and advantages to be hereinafter set forth I have provided a construction two embodiments of which are illustrated in the accompanying drawings, in which—

Figure 1 is a side elevation, partly in section, of an automobile truck constructed in accordance with my present invention;

Figure 2 is a section on the line 2—2 showing the gear connection between the engine shaft and the conveyor shaft;

Figure 3 is an end view of the automobile truck;

Figure 4 is a plan view of the lower part of the conveyor and the parts associated therewith;

Figure 5 is a side elevation of a portion of the conveyor frame and belt;

Figure 6 is a side elevation of a further form of truck constructed in accordance with my present invention; and Figure 7 is a plan view of the reversing mechanism for the conveyor shown in Figure 6.

Referring to the form of construction illustrated in Figures 1 to 5, the truck comprises a chassis 10 with the usual seat 11, engine and body 12 mounted thereon adjacent the forward end and a hopper body 13 mounted adjacent its rear end. This hopper body 13 is formed with a sloping bottom 14 and sloping sides 15 (see Figure 3) so that the material within it can slide towards its lowest portion which is at the rear and center of the receptacle. A conveyor is provided for transporting the material discharged from the lower end of the hopper body to any suitable adjacent point. This conveyor 16 is pivotally mounted at 56 on the chassis so that it may be moved from the position shown in full lines in Figure 3 to that shown in dotted lines in Figure 3 or to any position intermediate therebetween. The conveyor is arranged to move towards the right side of the trunk in preference to the left as it is more convenient to bring the right side of the truck next the curb than the left side. The upper or outer end of the conveyor is supported by means of the chain 17 attached to a bracket 18–A on the upper end of the conveyor. This chain 17 passes around a pulley 18 rotatably mounted at 19 on the frame of the truck. The chain then passes around a drum 20 provided with a ratchet wheel 21 and pawl 22 and operating handle 23.

The end of the truck is provided with a pair of upright members 24 and 25 preferably in the form of angle iron. These members project above the end of the hopper body of the truck and carry the cross member 26 on which the pulley 18 is mounted.

At the bottom rear end of the receptacle is arranged an open topped box 27 having a sloping bottom 28. A door 29 provides communication between the receptacle and the box 27. This door 29 is pivotally attached to the end of the hopper body at 30. Means such as a toggle joint (not shown) are employed for keeping the door closed against the edges 31 of the opening 32 in the rear portion of the hopper body (Figure 4).

The material passing through the opening 32 when the door is open falls onto the inclined bottom 28 of the box 27 and slides down towards the lower side where the lower end of the conveyor 16 is arranged and is picked up thereby.

The conveyor is shown more particularly in Figures 4 and 5. It comprises a central leather belt 33 and lateral chains 34 connected to the belt at 35. Flights 36 are attached to the belt at intervals by means of angle members 37 to hold material on the belt.

The conveyor is carried by a pair of shafts 56 and 57 as shown more particularly in Figure 4. The shaft 56 carries sprocket wheels 58 and 59 for the chains 34 on each side of the conveyor belt. Between these sprockets are arranged rollers 60 (three are provided in the construction illustrated) for supporting the leather portions 33 of the conveyor belt.

As there is a small space between the conveyor belt and the inclined plate 28 through which material can pass, a spill plate 70 is provided to catch such material. This spill plate is of such width that material will pile up thereon to such a height that the space referred to will be completely filled before material will fall over its edges to any appreciable extent. This spill plate is pivoted to the framing at 71 so that it can be turned out of the way by the plate 72 attached to the lower edge of the conveyor framing.

When the conveyor is moved into the position shown in dotted lines in Figure 3, the plate 72 comes into contact with the under side of the plate 28 and completely closes the space referred to. In order to prevent material sliding off the spill plate 70 as a result of its being tilted by the plate 72 the inner edge 73 is upturned as shown in Figure 3.

The conveyor is arranged in a trough including side members 38 and a bottom member 39. The bottom member 39 catches any material which may pass over the edges of the belt and between the side members 38.

The conveyor 16 is arranged to be driven by the engine of the truck. For this purpose a disengageable connection is provided between the shaft 40 and the conveyor. This connection comprises a clutch member 41 adapted to slide on a spline 42 on the shaft 40. This clutch member 41 is adapted to be moved into engagement with the clutch member 43 freely revoluble on the shaft 40 by means of lever 44 and link 45. The clutch member 43 carries a sprocket connected by chain 47 to the sprocket 48 on a countershaft 49. On the other end of this countershaft the pinion 50 is mounted which is in mesh with the gear wheel 51. The gear wheel 51 is mounted on the shaft 52 which carries at its other end the sprocket 53 connected by chain 54 to the sprocket 55. The sprocket 55 is arranged on the shaft 56 at the lower end of the conveyor.

The driving connection between the engine and the conveyor is made by the shaft 40 between the clutch 62 and the change speed transmission gear box 61 so that the clutch may be used to start and stop the conveyor and so that by placing the change speed gears in neutral position the conveyor may be operated by means of the engine without interfering with the normal driving mechanism of the truck.

The countershaft 49 serves three purposes, amongst others, first to provide means for transmitting power around the change speed transmission gear box, second to enable the desired speed reduction gearing to be employed and third to reverse the direction of rotation of the shaft 52 with respect to the shaft 40 in order that the conveyor will be moved in the correct direction. This reversal takes place at the result of using a chain and sprocket at one end of the countershaft 49 and gearing at the other end.

The hopper body is provided with sliding partitions 63 and 64 adapted to slide between pairs of guides 65 and 66 respectively. One of each of these pairs of guides, preferably the right hand one (Figure 1) consists of a plate extending across the hopper body and upwardly to the same level as the sides of the hopper body with a guide member extending upwardly therefrom as shown. As both the sliding partitions and their corresponding fixed guide plates are arranged to extend transversely of the hopper body they divide the latter into three compartments 67, 68 and 69. With this arrangement the contents of compartment 67 may be discharged at one place, the truck moved to another place and the contents of compartments 68 discharged there, and so on.

In Figures 6 and 7 a modified form of construction is shown in which the conveyor is employed both to discharge and fill the hopper body.

The conveyor 74 is arranged to turn about a shaft 75 arranged intermediate its ends. The shaft 74 is carried by bearings 76 mounted on extensions of the side members 77 of the truck chassis.

In one position the lower end of the conveyor is adjacent the lower rear end of the hopper body in position to receive material therefrom. In the other position the lower end of the conveyor projects away from the truck so as to engage a pile of material and lift the latter into the hopper body. The conveyor 74 is held in its two positions by means of the pivoted links 80 and 81, the link having a right angled extension 82 adapted to act as an operating handle.

In order to direct material discharged from the hopper body through the door 95 to the conveyor when in the position shown in full lines in Figure 6, side plates 96 are provided, the lower ends of which are substantially in contact with the side plates of the conveyor.

In order to facilitate the filling of the hopper body when the conveyor is in the position shown in dotted lines in Figure 6 the end portion 78 of the hopper body is forwardly inclined as shown at 79 to allow the upper end of the conveyor to move well over the end of the hopper body.

The conveyor in either position is driven through the shaft 75 which carries a sprocket wheel 83 and a bevel gear 84. The sprocket wheel 83 is connected to the sprocket 85 at the upper end of the conveyor. The conveyor is preferably driven from its upper end as shown, to avoid clogging the gearing when the lower end of the conveyor is pushed into a heap of material to be lifted into the hopper.

The bevel gear 84 is arranged to mesh with two bevel gears 86 and 87 revoluble on the shaft 88 which are provided with clutch faces 86' and 87' adapted to engage alternately with the clutch member 89 slidably but non-rotatably mounted on the shaft 88. The clutch member 89 is moved along the shaft 88 by means of the pin 90 carried by the hand-lever 91.

The shaft 88 is driven by the shaft 92 through the gear wheel 93 and pinion 94. No clutch is provided between the shafts 88 and 92 as the necessary disconnection between the conveyor and the shaft 92 can be made by the clutch 89.

Having thus described my invention and illustrated its use, what I claim as new and desire to secure by Letters Patent is:

1. An unloading device of the kind described comprising in combination a vehicle, a receptacle carried thereby, a conveyor adjacent the rear end of said receptacle, a source of power adjacent the front end of said vehicle, a shaft driven thereby adapted to transmit power to the wheels of said vehicle, speed change mechanism therefor and a disengageable connection between said conveyor and said shaft at a point on said shaft between said source of power and said speed change mechanism.

2. An unloading device of the kind described comprising in combination a vehicle, a receptacle carried thereby, a conveyor adjacent said receptacle, a source of power, a shaft driven thereby adapted to transmit power to the wheels of said vehicle, speed change mechanism therefor and a disengageable connection between said conveyor and said shaft at a point on said shaft between said source of power and said speed change mechanism.

3. An unloading device of the kind described comprising in combination, a vehicle, a receptacle carried thereby, a conveyor adjacent said receptacle, a source of power, a shaft driven thereby, a second shaft adapted to drive said conveyor, a third shaft adapted to drive the wheels of said vehicle and disengageable connections on said first shaft adapted to transmit power to said second and third shafts alternatively.

In testimony whereof, I have hereunto signed my name in the presence of the two subscribing witnesses.

WILLIAM T. JAMES.

Witnesses:
  EDWARD H. DAVIS,
  RIDSDALE ELLIS.